(12) United States Patent
Tell (10) Patent No.: US 8,848,975 B2
(45) Date of Patent: Sep. 30, 2014

(54) EFFICIENT AND ACCURATE 3D OBJECT TRACKING

(75) Inventor: Dennis Tell, Zurich (CH)

(73) Assignee: Seeing Machines Pty Ltd (AU)

( * ) Notice: Subject to any disclaimer, the term of this patent is extended or adjusted under 35 U.S.C. 154(b) by 1124 days.

(21) Appl. No.: 12/554,625

(22) Filed: Sep. 4, 2009

(65) Prior Publication Data

US 2009/0324018 A1    Dec. 31, 2009

Related U.S. Application Data

(63) Continuation of application No. PCT/AU2008/000290, filed on Mar. 4, 2008.

(30) Foreign Application Priority Data

Mar. 5, 2007    (AU) ................................ 2007901129

(51) Int. Cl.
*G06K 9/00* (2006.01)
*G06T 7/20* (2006.01)
*G06T 7/00* (2006.01)

(52) U.S. Cl.
CPC .......... *G06K 9/00248* (2013.01); *G06T 7/2046* (2013.01); *G06K 9/00208* (2013.01); *G06T 7/208* (2013.01); *G06T 7/0046* (2013.01); *G06T 2207/10016* (2013.01); *G06T 2207/30201* (2013.01)
USPC ...................................................... 382/103

(58) Field of Classification Search
None
See application file for complete search history.

(56) References Cited

U.S. PATENT DOCUMENTS

| | | | |
|---|---|---|---|
| 6,256,418 B1 | 7/2001 | Rehg et al. | |
| 6,917,692 B1 | 7/2005 | Murching et al. | |
| 7,043,056 B2 | 5/2006 | Edwards et al. | |
| 7,103,211 B1 * | 9/2006 | Medioni et al. | ............... 382/154 |
| 2004/0165781 A1 | 8/2004 | Sun | |
| 2004/0247174 A1 | 12/2004 | Lyons et al. | |

FOREIGN PATENT DOCUMENTS

| | | |
|---|---|---|
| EP | 1139269 A2 | 10/2001 |
| WO | 02091305 A2 | 11/2002 |
| WO | 03081532 A1 | 10/2003 |
| WO | 2004111927 A2 | 12/2004 |

OTHER PUBLICATIONS

Chil-Woo, et al.; "A Visual Interaction System Using Real-Time Face Tracking"; Oct. 31, 1994; pp. 1282-1286.
European Search Report; Application No. EP 08 71 4340; Issued: Nov. 10, 2011; Mailing Date: Nov. 12, 2011; 5 pages.
Cootes et al 2001 (T. Cootes, G. Edwards, C. Taylor, "Active appearance models", IEEE Transactions on Pattern Analysis and Machine Intelligence, 23(6):681-685, 2001).

(Continued)

*Primary Examiner* — Vikkram Bali
(74) *Attorney, Agent, or Firm* — St. Onge Steward Johnston & Reens LLC (57) ABSTRACT

A method of tracking an object in an input image stream, the method comprising iteratively applying the steps of: (a) rendering a three-dimensional object model according to a previously predicted state vector from a previous tracking loop or the state vector from an initialization step; (b) extracting a series of point features from the rendered object; (c) localizing corresponding point features in the input image stream; (d) deriving a new state vector from the point feature locations in the input image stream.

15 Claims, 3 Drawing Sheets

(56) References Cited

OTHER PUBLICATIONS

Matthews et al (I. Matthews and S. Baker, "Active appearance models revisited, International Journal of Computer Vision", vol. 60, No. 2, Nov. 2004, pp. 135-164).

Hu et al (C. Hu, R. Feris, M. Turk), "Active Wavelet Networks for Face Alignment", Proceedings of British Machine Vision Conference, Norwich, 2003; 10 pages.

Advances in Active Appearance Models. Cootes et al. The proceedings of the seventh IEEE International Conference on Computer vision. vol. 1. 1999 pp. 137-142.

Face Model adaptation using Robust matching and active appearance models. Dornika and Ahlberg. 2002 (WACV) Proceedings Sixth IEEE Workshop on Applications of Computer Vision; 6 pages.

Fast and Reliable Active Appearance Model Search for 3-D Face Tracking. Dornaika and Ahlberg. IEEE Transactions on Systems, Man, and Cybernetics-part B CYBERNETICS, vol. 34. No. 4 Aug. 2004; 16 pages.

International Search Report and Written Opinion of the International Searching Authority; PCT/AU2008/000290; Apr. 7, 2008; 8 pages.

De la Torre et al (F. De la Torre, M. Black, "Robust parametrized component analysis: theory and applications of 2D facial appearance models", Computer Vision and Image Understanding 91 (2003) 53-71).

Seeing Machines, Makers of faceLAB-Head, Eye & Blink tracking. Creators of Visionary Technology. faceAPI. Real time 3D head Tracker Demonstration. The Ultimate Real-Time face Tracking Toolkit for Developers and OEM's. Retrieved on Apr. 2, 2008. www.archive.org/web/20070127214200/http://www.seeingmachines.com; www.seeingmachines.com/faceARI.html; 11 pages.

The image Chip for High Performance 3D Rendering by Dunnett et al. Computer Graphics and Applications. IEEE vol. 12. Issue 6. Nov. 1992 pp. 41-52.

Cootes et al 2002 (T. Cootes, G. Wheeler, K. Walker, C. Taylor, "View-based active appearance models", Image and Vision Computing, 20:657-664, 2002).

\* cited by examiner

EFFICIENT AND ACCURATE 3D OBJECT TRACKING

CROSS-REFERENCE TO RELATED APPLICATIONS

The present application is a continuation of International patent application PCT/AU2008/000290 filed on Mar. 4, 2008 which designates the United States and claims priority from Australian patent application 2007901129 filed on Mar. 5, 2007, the content of which is incorporated herein by reference.

FIELD OF THE INVENTION

The present invention relates to methods for measurement of the three-dimensional (3D) pose of a three-dimensional object.

The invention has been developed primarily for use in the context of human face tracking and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of common general knowledge in the field.

The tracking of faces and facial features, such as a person's eyes, has attracted considerable interest over the past decade, as computers have become sufficiently powerful to enable practical solutions to this problem.

There are two known approaches that have been proposed for solving this problem. The first approach is a geometric approach utilising three-dimensional point features in the face and geometric reasoning to derive the three-dimensional pose. The second is a non-linear optimisation of the parameters of an appearance model.

The first approach using point features has an advantage that it is a deterministic. Non-iterative approaches provide for short and predictable time to calculate the solution, and have been popular for real-time systems. Edwards et al (U.S. Pat. No. 7,043,056) disclose a typical proponent of this methodology.

The second approach is an iterative, non-linear optimisation problem, which in general is computationally expensive. Trade-offs in terms of predictable convergence accuracy are required to achieve predictable computation times. Depending on the parameters of the appearance mode, an advantage of this approach is that a better fidelity of tracking can be achieved. It is understood that because the appearance of the observed object can be modelled and predicted more accurately than with the point feature approach. Cootes et al 2001 (T. Cootes, G. Edwards, C. Taylor, "Active appearance models", IEEE Transactions on Pattern Analysis and Machine Intelligence, 23(6):681-685, 2001), Cootes et al 2002 (T. Cootes, G. Wheeler, K. Walker, C. Taylor, "View-based active appearance models", Image and Vision Computing, 20:657-664, 2002) and Matthews et al (I. Matthews and S. Baker, "Active appearance models revisited", International Journal of Computer Vision, Vol. 60, No. 2, November, 2004, pp. 135-164) discloses a typical implementation of this methodology.

De la Torre et al (F. De la Torre, M. Black, "Robust parametrized component analysis: theory and applications of 2D facial appearance models", Computer Vision and Image Understanding 91 (2003) 53-71) discloses the use of a person-specific two-dimensional active appearance model, which is not capable of tracking a person in three dimensions.

Dornaika et al (F. Dornaika, J. Ahlberg "Face model adaptation using robust matching and active appearance models", Proceedings of Sixth IEEE Workshop on Applications of Computer Vision, 2002. (WACV 2002), 3-7) and Hu et al (C. Hu, R. Feris, M. Turk, "Active Wavelet Networks for Face Alignment", Proceedings of British Machine Vision Conference, Norwich, 2003) disclose splitting a rendered face into sub-features, but fail to model and exploit the overlapping nature of facial features. A typical example for these occlusions occurs when the face is seen in a semi-profile view, where the ridge of the nose forms an edge over the far cheek. Previous systems are limited to the non-occluded view to features, and fail as soon as features start overlapping due to the projection of the facial features in the image.

It would be appreciated that technical challenges associated with this problem are considerable, in particular since an object such as the human face has high inter-individual variations, and the face is a highly articulate object.

There is a need in the art for automatic tracking of human faces in video sequences.

SUMMARY OF THE INVENTION

It is an object of the present invention to provide an improved form of three-dimensional object tracking.

In accordance with a first aspect of the present invention, there is provided a method of tracking an object in an input image stream, the method comprising iteratively applying the steps of: (a) rendering a three-dimensional object model according to a previously predicted state vector from a previous tracking loop or the state vector from an initialisation step; (b) extracting a series of point features from the rendered object; (c) localising corresponding point features in the input image stream; (d) deriving a new state vector from the point feature locations in the input image stream.

This method can also include an initialisation steps of (i) creation of a three-dimensional model of the object to be tracked; (ii) initial detection of the objects position within an input image stream.

Step (d) preferably includes the further step of: selecting a set of consistent features followed by Kalman filtering of the features to provide the new state vector.

The object can comprise a face and the state vector can comprise the three dimensional pose of the face. In one embodiment, the selecting of a set of features comprises random sample consensus (RANSAC) selection of the features. The localising step preferably can include utilising a normalised cross-correlation process to localise the point features.

It would be appreciated that embodiments of the present invention are has been primarily developed in the context of human face tracking. However, the present invention is applicable to other domains where the three-dimensional pose of an arbitrary object is to be measured visually.

In accordance with a second aspect of the present invention, there is provided a method of tracking an object in an input image stream, the method comprising steps of:
 (i) creating a three-dimensional model of the object to be tracked;
 (ii) localising initial features points in an initial input image stream;
 (iii) calculating an initial state vector indicative of the object location within the input image stream, wherein the initial state vector is calculated by minimising the square error between the initial localised feature points and corresponding initial feature points of the three-dimensional model projected into the image plane;
(a) rendering a three-dimensional object model, wherein the object model accords with either the predicted state vector calculated in step (d) of a previous iteration or the initial state vector calculated in step (ii), wherein the rendering includes calculating a mask for the input image stream to distinguishing between background and foreground pixels;
(b) calculating a predefined number of point features from the rendered object, wherein the predefined number of locations having highest edginess are selected as features from the rendered image of the previous iteration for the following localisation step;
(c) localising corresponding point features in the input image stream;
(d) calculating a new state vector from the localised point features in the input image stream; and
(e) iteratively performing steps (a) though (d) for providing at each iteration updated the new state vector from the localised point features.

The localisation step preferably uses a masked normalised template correlation to calculate new the localised point features.

The new state vector is preferably calculated by using Random Sample Consensus selection and followed by a Kalman filter for estimating the new state vector. The Kalman filter preferably utilises a constant acceleration motion model of the object to predict the new state vector of the object from previously calculated state vectors and the new localised point features.

In accordance with a third aspect of the present invention, there is provided a computer program or computer program product comprising a set of instructions for carrying out a method according to any previously described method of tracking an object in an input image stream.

In accordance with a fourth aspect of the present invention, there is provided a computer-readable carrier medium carrying a set of instructions that when executed by one or more processors cause one or more processors to carry out a method of tracking an object in an input image stream, as previously described.

The carrier medium is preferably a medium bearing a propagated signal detectable by at least one processor of the one or more processors and representing the set of instructions.

In accordance with a fifth aspect of the present invention, there is provided a system for tracking an object in an input image stream, the system comprising a processor adapted to receive an input image stream, the processor is further adapted to perform a method of tracking an object in an input image stream, as previously described.

In accordance with a sixth aspect of the present invention, there is provided a system for tracking an object in an input image stream, the system comprising a processor adapted to receive an input image stream, the processor is further adapted to perform the steps of:
(i) creating a three-dimensional model of the object to be tracked;
(ii) localising initial features points in an initial input image stream;
(iii) calculating an initial state vector indicative of the object location within the input image stream, wherein the initial state vector is calculated by minimising the square error between the initial localised feature points and corresponding initial feature points of the three-dimensional model projected into the image plane;
(a) rendering a three-dimensional object model, wherein the object model accords with either the predicted state vector calculated in step (d) of a previous iteration or the initial state vector calculated in step (ii), wherein the rendering includes calculating a mask for the input image stream to distinguishing between background and foreground pixels;
(b) calculating a predefined number of point features from the rendered object, wherein the predefined number of locations having highest edginess are selected as features from the rendered image of the previous iteration for the following localisation step;
(c) localising corresponding point features in the input image stream;
(d) calculating a new state vector from the localised point features in the input image stream; and
(e) iteratively performing steps (a) though (d) for providing at each iteration updated the new state vector from the localised point features.

The processor is preferably adapted to perform a masked normalised template correlation for calculating new localised point features. The processor is preferably adapted to apply the new localised point features into a Kalman filter for calculating the new state vector.

The invention has particular application in human performance assessment, the evaluation of the ergonomics of the design of human-machine interfaces, in safety applications to monitor distraction and fatigue, and in entertainment applications, where measurements are taken from a real person to be then rendered by a computer on an avatar.

BRIEF DESCRIPTION OF THE DRAWINGS

A preferred embodiment of the invention will now be described, by way of example only, with reference to the accompanying drawings in which.

DETAILED DESCRIPTION OF THE INVENTION

The proposed method incorporates the advantages of both high accuracy in predicted appearance (and therefore high fidelity), and fast and predictable computation of point feature calculation. The preferred embodiment relates to methods for highly accurate yet efficient visual measurement of the three-dimensional pose of a three-dimensional object. It would be appreciated that three-dimensional pose is a measure indicative of a three dimensional location and orientation, typically represented as six parameters. The method utilises components of feature based tracking methods with appearance-based methods referred to as "active appearance models". The result is a highly efficient and accurate method to track and visually measure the pose of an object.

Overview of the Preferred Embodiment

Figure 1:
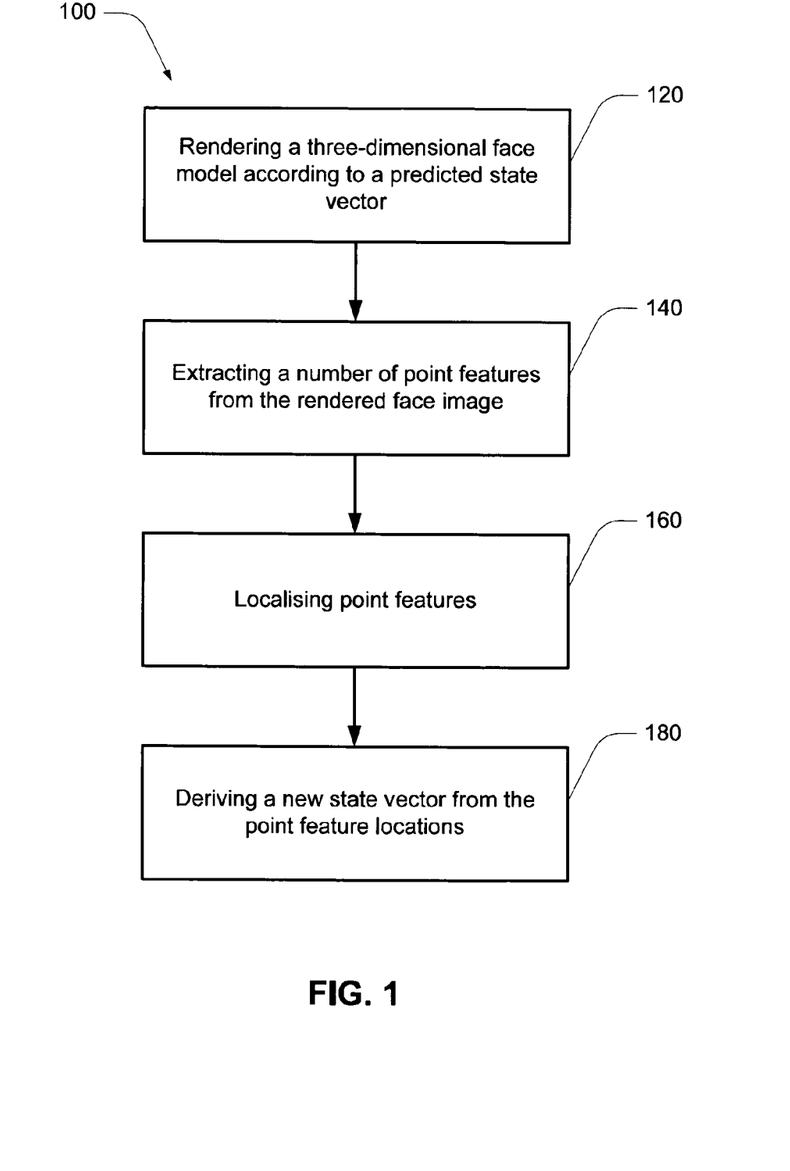
FIG. 1 is a flowchart of a method according to an embodiment of the invention.

Referring to FIG. 1, a flowchart representation 100 of method according to an embodiment of the present invention is disclosed, this method comprises the steps of:

(a) rendering a three-dimensional face model according to a predicted state vector; 120
(b) extracting a number of point features from the rendered face image; 140
(c) localising point features; 160 and
(d) deriving a new state vector from the point feature locations 180.

Figure 2:
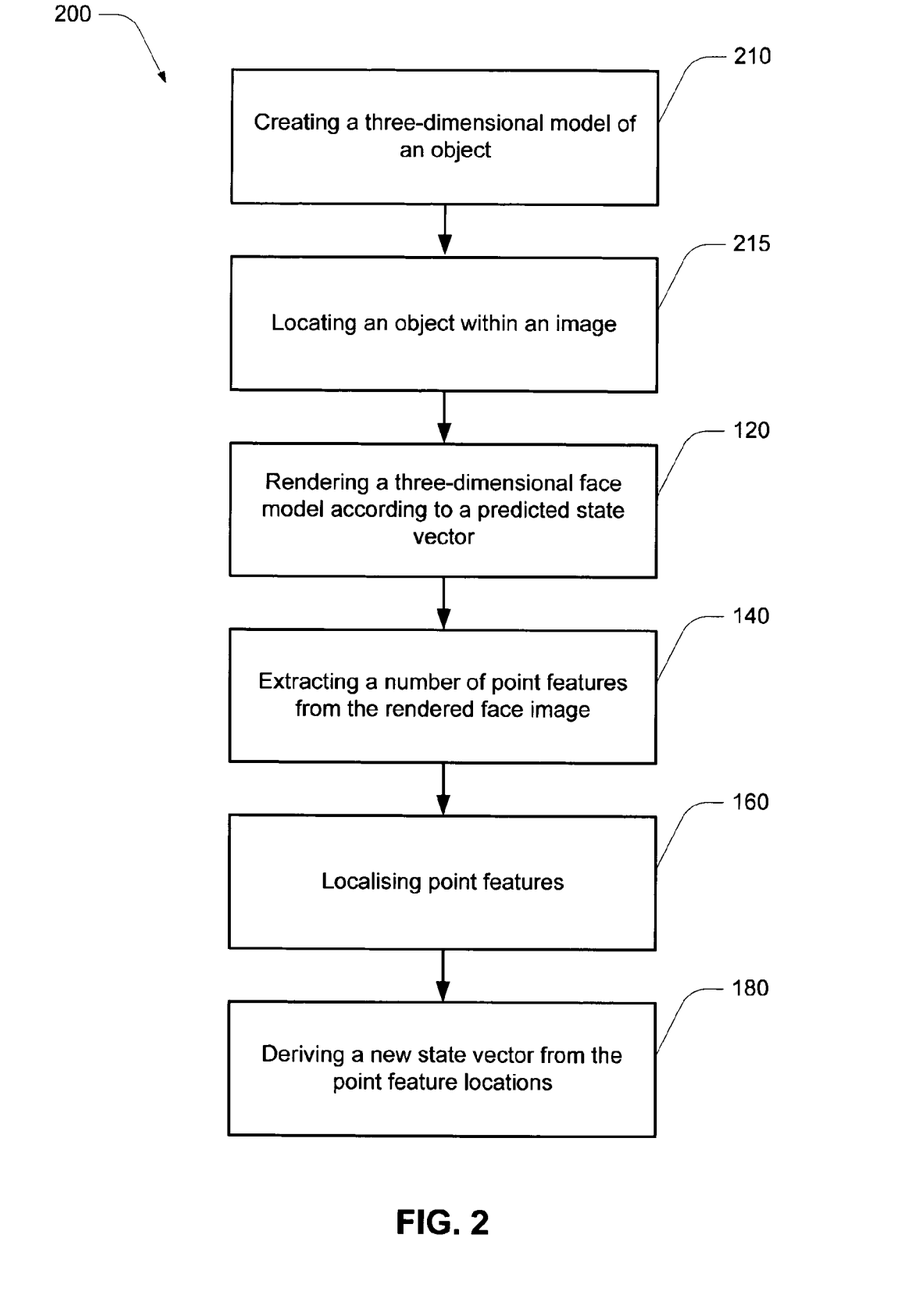
FIG. 2 is a flowchart of a method similar to FIG. 1, showing initialisations steps.

Referring to FIG. 2, an initial step of a method 200, according to the preferred embodiment (and other related methods), includes creating a suitable three-dimensional model 210 of a face that is to be tracked—or equivalently an object that is to be tracked. Within this method, the makeup of the model is dependant on the type of tracking method. By way of example only, the model used in the method according to the preferred embodiment consists of a textured three-dimensional model of a face. This model allows a computer rendering of the face in any position and orientation. Locating a face within an image 215 provides an initial estimated facial location. Once the facial location is identified within an image, texture is mapped onto a generic three-dimensional model of a face by projecting the texture onto the vertices. By way of example only, Loy et al (Patent Cooperation Treaty, Application No. PCT/AU2003/000345, Publication Number WO/2003/081532) discloses a method used to identify the facial location within an image.

It would be appreciated by a person skilled in the art that the texture is mapped onto a generic three-dimensional model of a face by projecting the texture onto the vertices. By way of example only, a method of texture mapping in described in Dornaika et al.

After the above initialisation steps are performed, a main tracking loop is entered. This tracking loop utilises the textured three-dimensional model and estimates the state vector of the face for each image in an image stream. The steps involved in this tracking loop are described below:

(1) Rendering a three-dimensional face model according to a predicted state vector, 120. This predicted state vector is preferably derived from a previous tracking loop or a state vector from the initialisation steps.
(2) Extracting a number of point features from the rendered face image, 140.
(3) Localising point features, 160. Point feature localisation is derived with a suitable point feature localisation method. In the preferred embodiment the point feature localisation method is normalised cross-correlation.
(4) Deriving a new state vector from the point feature locations 180. In the preferred embodiment, derivation of this new state vector from the point feature locations is performed through "Random Sample Consensus" (RANSAC) selection of a set of consistent features, and is followed by a Kalman filter to estimate the new state vector which in the present case is the three-dimensional pose.

This tracking loop, comprising steps (1) through (4) can be iterated indefinitely, or until the tracking of the face fails and a new initialisation is required.

By way of example only, individual steps are described in more detail below.

Step (0)—Initialisation

Initialisation requires the localisation of the face as a whole and key individual features. In the preferred embodiment, a method disclosed by Loy et al is utilised for the production of this localisation. This method allows the localisation of the face, the location of the four eye corners, the nostrils if visible and the two mouth corners. These features are represented as reference points $R=\{r_i \epsilon R^3\}$ of the model.

Since this three-dimensional model uses a rigid three-dimensional model, only six pose parameters (for example including three translational and three rotational) are need to be estimated for fitting a generic three-dimensional face geometry model to the image. This generic model 'M' comprises corner vertices $v_i$ and triangular planar surfaces $s_j$, and approximates an average face geometry. This generic molde can be expressed in the following equation.

$$M=\{v_i \epsilon R^3, s_j\}$$

It would be appreciated by a person skilled in the art that, representation of surface as a plurality of adjacent triangle is a technique used in three-dimensional graphic rendering and modelling. However, it would also be appreciated that other models are appropriate for use in the present invention.

By way of example only, this model captures a face from the forehead to the chin (typically in the vertical direction), and the area up to the ears (typically in the horizontal direction). This model excludes the hair of the person.

Three-dimensional pose $P=\{r_p \epsilon R^3, t_p \epsilon R^3\}$, comprising rotational components $r_p \epsilon R^3$ and translational components $t_p \epsilon R^3$, is estimated by aligning the three-dimensional model with the localised image features. By way of example only, this alignment can be made such that the square-error between the reference points of the three-dimensional model projected into the image plane R(p) and the image locations of the image points $R_i$ is minimised. This alignment minimisation can be represented by the following equation.

$$P_{init} = \mathop{\mathrm{argmin}}_{r,\,t} \left( \sum \|R(p) = R_I\| \right)$$

Dornaika et al describes a method using a weak perspective assumption that is utilised in the preferred embodiment. It would be appreciated by a person skilled in the art that there are a number of optimisation techniques that can be used for performing model alignment.

Texture for each model triangle can be extracted from an image and stored with a three-dimensional geometric model. Combining the three-dimensional geometry and the texture for determining a three-dimensional model required for tracking. The predicted head pose $\overline{P}$ after initialisation is equivalent to the fitted three-dimensional model pose $P_{init}$.

Step (1)—Rendering

In the rendering step, the textured three-dimensional face model is typically rendered according to the head pose as predicted by the state estimation step (or the initialisation step if this is the first iteration). This can be computed using common computer graphics methods known to a person skilled in the art.

It would be appreciated that hardware (for example 3D graphics card) and/or software (for example OpenGL) can be to accelerate this step. The person skilled in the art is aware of these techniques.

The output of this step includes a rendered face image and a mask for distinguishing between pixels that are background and pixels that are foreground.

Step (2)—Feature Extraction

A set of features $F=\{f_k\}$ are selected for use in the following steps. In the preferred embodiment, the set of features are dynamic and can vary at each tracking cycle to optimise robustness.

It would be appreciated that, by way of example only, feature extraction methods can use either an entire image rendered face image (for example as disclosed in Cootes et al 2001 and Cootes et al 2002), vertices extracted from the model (for example as disclosed in Dornaika et al), or feature sets extracted from a frontal view without occlusions.

A drawback associated with using the entire rendered face is that the state vector can only be calculated in an iterative and computationally expensive manner. Depending on the distance metric used to establish the similarity of the rendered image with the live image from the camera, this approach typically has a significant sensitivity to inhomogeneous lighting conditions. Vertices or pre-extracted features can lack the ability to model and exploit the edges created from partial self-occlusion of the face due to the ridge of the nose occluding the far cheek when the head is rotated slightly.

To overcome these limitations, the method disclosed herein uses features computed from the rendered image in a previous tracking iteration. A predefined number of locations with the highest edginess are selected as features from the rendered image of the previous iteration for the following localisation step. The edginess 'e' of the location (x,y) in image 'I' is defined as the magnitude of the gradient of the image location, as calculated using the following equation.

$$e(I(x, y)) = \left| \frac{I(x, y)}{dxdy} \right|$$

An exhaustive search is performed to find $f_k$ with the highest gradient values in the image. The output of this step includes a set of tracking features $F=\{f_k\}$.

Step (3)—Feature Localisation

Features selected in the previous step must be localised in a newly acquired image of the face. It would be appreciated by a person skilled in the art that this localisation could be computed using a number of methods used for feature localisation and tracking. In the preferred embodiment, a masked normalised template correlation is used to calculate the new location of the features.

For localisation, a 16×16 pixel template centred on the feature location $f_k$ is extracted from the rendered image and masked by the rendering mask of the face, to exclude any background pixel which might be part of region defined by the 16×16 pixel template.

A person skilled in the art is aware of the commonly used formulation of normalised cross-correlation, as expressed in the following equation.

$$C(u, v) = \frac{\sum_{x,y}(I(u+x, v+y) - \bar{I}_{u,v})\hat{T}(x, y)}{\sqrt{\sum_{x,y}(I(u+v, v+y) - \bar{I}_{u,v})^2 \sum_{x,y}\hat{T}(x, y)^2}}$$

In this equation, I is the image and T is the template. $\hat{T}$ is the brightness normalised template $\hat{T}=T(x,y)-\bar{T}$ and $\bar{T}$ is the template mean. $\bar{I}_{u,v}$ is the local image mean at location (u,v), the mean of the image underneath the template whose top left corner lies on pixel (u,v). Furthermore, the sums and image mean are subject to the masking, i.e. not considering pixels that are masked out.

Around the predicted position of each feature, a search window is located. Within this search window, an exhaustive search is performed to find the location of the feature with the aforementioned correlation technique. The location of that point (or pixel) with the highest correlation score is selected as the new feature location $\hat{f}_k$.

The output of the feature localisation step includes the new feature locations $\hat{F}$ for the set of selected features F.

Step (4)—State Estimation

In the preferred embodiment, by way of example only, the state vector consists of the six three-dimensional pose-parameters only. This state vector can be calculated by applying the new feature locations into a Kalman filter of the type as disclosed by Edwards et al. This Kalman filter utilises a constant acceleration motion model of the face to predict the new position of the face from previous estimates and the newly acquired measurements. The Kalman filter can also allows the prediction of the head pose state vector $\overline{P}$ for the next image frame.

The output of the state estimation step includes the predicted state vector $\overline{P}$, which is forwarded to the rendering step in the next iteration of the algorithm. It would be appreciated that steps (1) though (4) can be applied iteratively to provide a relatively efficient and accurate method for three-dimensional object tracking.

By way of example only, an embodiment of a method of tracking an object in an input image stream, comprises the steps of:

(i) creating a three-dimensional model of the object to be tracked;

(ii) localising initial features points in an initial the input image stream;

(iii) calculating an initial state vector indicative of the object location within the input image stream, wherein the initial state vector is calculated by minimising the square error between the initial localised feature points and corresponding initial feature points of the three-dimensional model projected into the image plane;

(a) rendering a three-dimensional object model, wherein the object model accords with either the predicted state vector calculated in step (d) of a previous iteration or the initial state vector calculated in step (ii), wherein the rendering includes calculating a mask for the input image stream to distinguishing between background and foreground pixels;

(b) calculating a predefined number of point features from the rendered object, wherein the predefined number of locations having highest edginess are selected as features from the rendered image of the previous iteration for the following localisation step;

(c) localising corresponding point features in the input image stream;

(d) calculating a new state vector from the localised point features in the input image stream; and (e) iteratively performing steps (a) though (d) for providing at each iteration updated the new state vector from the localised point features.

It would be further appreciated that this method can be performed in real-time or on live video data.

It would be appreciated that the above methods can be performed, at least in part, by a computer program. A computer program or computer program product comprising a set of instructions for carrying out a method as previously described. A computer-readable carrier medium can embody the above methods. This computer-readable carrier medium carrying a set of instructions that when executed by one or more processors cause one or more processors to carry out a method according to a previously described method. This carrier medium is a medium bearing a propagated signal detectable by at least one processor of the one or more processors and representing the set of instructions.

Figure 3:
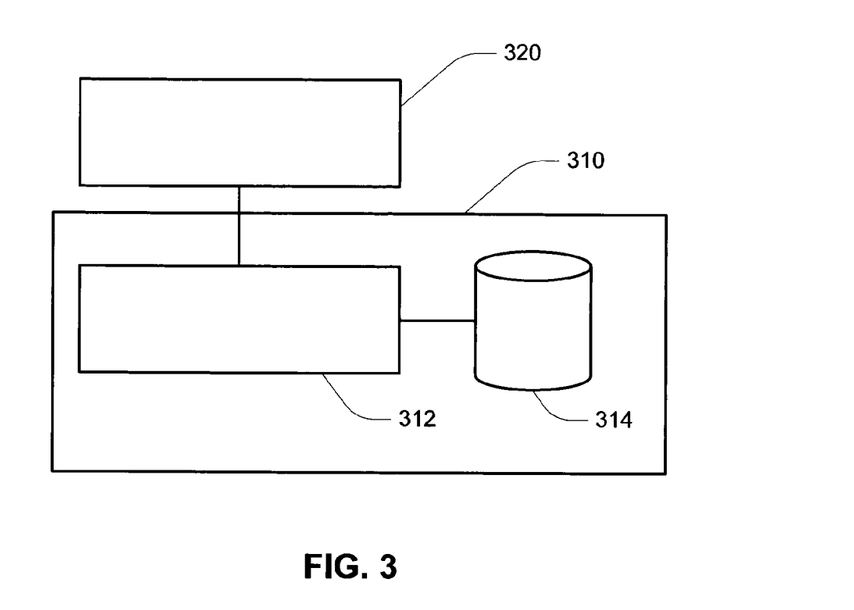
FIG. 3 is a schematic view of a system according to an embodiment of the invention.

FIG. 3 discloses a schematic view of a system according to an embodiment. A computer system 310, includes a processor 312 adapted to performer the steps of:
(a) rendering a three-dimensional face model according to a predicted state vector;
(b) extracting a number of point features from the rendered face image;
(c) localising point features; and
(d) deriving a new state vector from the point feature locations.

In an embodiment, the processor 312 is adapted to receive model data from a data storage device 314. This model data is indicative of a suitable three-dimensional model of a face (or object) that is to be tracked. It would be appreciated that, in an alternative embodiment, model data can be received from an external data storage device.

In an embodiment, the processor 312 is further adapted to receive live video data from a video capture device 320. It would be appreciated that, in an alternative embodiment, video data can be received from a data storage device (for example data storage device 314). The processor is adapted to locate a face (or object) within an image to provide an initial estimated facial location. Once the facial location is identified within an image, texture is mapped onto a generic three-dimensional model of a face by projecting the texture onto the vertices.

Figure 4:
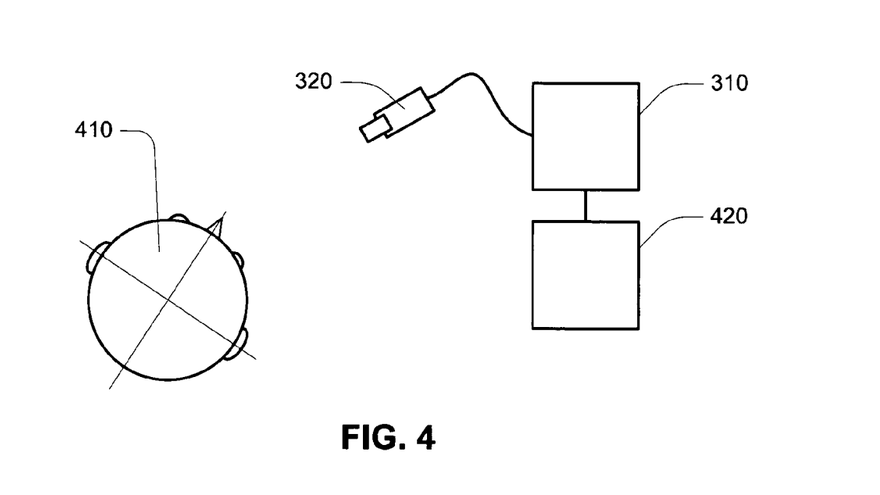
FIG. 4 is a schematic view of a system according to an embodiment of the invention, shown tracking a three-dimensional object.

FIG. 4 discloses a schematic view of an embodiment shown tracking a three-dimensional object 410 in real time. In this embodiment a computer system 310 is couples to a video capture device in the form of a video camera 320. The video camera is adapted to transmit video data, which is received by the computer system. The computer system performs a method of measuring the three-dimensional (3D) pose of a three-dimensional object as previously disclosed. Data indicative of the measured three-dimensional pose can be output on an output devise 420. It would be appreciated that, in an alternative embodiment, data indicative of the measured three-dimensional pose can be stored in data storage device for later retrieval.

Variations

A number of variations of the above embodiment can include the use of more than one camera and the use of alternative methods employed in the individual computational steps.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing", "computing", calculating", "determining", "applying", "deriving" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computer system" or a "computing machine" or a "computing platform" may include one or more processors.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It would be appreciated that, some of the embodiments are described herein as a method or combination of elements of a method that can be implemented by one or more processors of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the computer system comprising one or more processors operates as a standalone device or may be configured, e.g., networked to other processor(s), in a networked deployment. The one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the invention has been described with reference to specific examples it will be appreciated by those skilled in the art that the invention may be embodied in many other forms.

What is claimed is:

1. A method of tracking a location of a face in an input image stream, said method comprising iteratively applying the steps of:
   (a) performing a computerized three-dimensional (3D) to two-dimensional (2D) rendering of a predefined textured 3D face model indicative of at least a portion of a face to produce a 2D rendered image including said face, the 3D-to-2D rendering being performed according to a previously predicted state vector derived from a previous tracking loop or a state vector from an initialisation step, wherein said state vector comprises the pose of said face;
   (b) processing said 2D rendered image to extract a series of point features from the portion of the face in said 2D rendered image;
   (c) localising corresponding point features in a current 2D image of said input image stream by comparing said 2D rendered image with said current 2D image;
   (d) deriving a new state vector from said localised point feature in the input image stream, the new state vector being indicative of a current location of said face within said input image stream.

2. A method as claimed in claim 1 further comprising an initialisation step of
   (i) creation of a three-dimensional face model to be tracked;
   (ii) initial detection of said face's position within said input image stream.

3. A method as claimed in claim 1 wherein said step (d) further includes a step of selecting a set of consistent features followed by Kalman filtering of said features for deriving said new state vector.

4. A method as claimed in claim 3 wherein the step of selecting of a set of consistent features comprises random sample consensus (RANSAC) selection of said features.

5. A method as claimed in claim 1 wherein said state vector comprises the three-dimensional pose of said face.

6. A method as claimed in claim 1 wherein said localising step includes utilising a normalised cross-correlation process to localise said point features.

7. A method of tracking an object in an input image stream, the method comprising steps of:
   (i) creating a three-dimensional model of said object to be tracked;
   (ii) localising initial features points in an initial said input image stream;
   (iii) calculating an initial state vector indicative of a location of said object within said input image stream, wherein said initial state vector is calculated by minimising the square error between localised said initial features points and corresponding initial features points of said three-dimensional model projected into an image plane;
   (a) rendering said three-dimensional object model, wherein said object model accords with either a predicted state vector calculated in step (d) of a previous iteration or said initial state vector calculated in step (iii), wherein the rendering includes calculating a mask for said input image stream to distinguish between background and foreground pixels;
   (b) calculating a predefined number of point features from said object, wherein a corresponding predefined number of locations having highest edginess is selected as features from an image of said input image stream corresponding to the previous iteration for the following localisation step;
   (c) localising corresponding point features in said input image stream;
   (d) calculating a new state vector from localised said features points in said input image stream; and
   (e) iteratively performing steps (a) though (d) for providing at each iteration updated said new state vector from localised said features points.

8. A method according to claim 7, wherein the step of localising initial features points uses a masked normalised template correlation to calculate new localised said features points.

9. A method according to claim 8, wherein said new state vector is calculated by using Random Sample Consensus selection and followed by a Kalman filter for estimating said new state vector.

10. A method according to claim 9, wherein said Kalman filter utilises a constant acceleration motion model of said object to predict said new state vector of said object from state vectors calculated in previous iterations and said new localised features points.

11. A computer system including a non-transitory medium programmed with a set of executable instructions for carrying out a method of tracking a location of a face in an input image stream, said method comprising iteratively applying the steps of:
   (a) performing a computerized three-dimensional (3D) to two-dimensional (2D) rendering of a predefined textured 3D face model indicative of at least a portion of a face to produce 2D a rendered image including said face, the 3D-to-2D rendering being performed according to a previously predicted state vector derived from a previous tracking loop or a state vector from an initialisation step, wherein said state vector comprises the pose of said face;
   (b) processing said 2D rendered image to extract series of point features from said face in said rendered 2D image;
   (c) localising corresponding point features in a current 2D image of said input image stream by comparing said 2D rendered image with said current 2D image;
   (d) deriving a new state vector from said localised point feature in the input image stream, the new state vector being indicative of a current location of said face within said input image stream.

12. A non-transitory, tangible computer-readable carrier medium carrying a set of instructions that when executed by one or more processors cause one or more processors to carry out a method of tracking a location of a face in an input image stream, said method comprising iteratively applying the steps of:
   (a) performing a computerized three-dimensional (3D) to two-dimensional (2D) rendering of a textured 3D face model indicative of at least a portion of a face to produce a 2D rendered image including said face, the 3D-to-2D rendering being performed according to a previously predicted state vector derived from a previous tracking loop or a state vector from an initialisation step, wherein said state vector comprises the pose of said face;

(b) processing said 2D rendered image to extract series of point features from said face in said rendered 2D image;

(c) localising corresponding point features in a current 2D image of said input image stream by comparing the 2D rendered image with said current 2D image;

(d) deriving a new state vector from said localised point feature in the input image stream, the new state vector being indicative of a current location of said face within said input image stream.

13. A system for tracking an object in an input image stream, the system comprising a processor adapted to receive an input image stream, said processor is further adapted to perform the steps of:

(i) creating a three-dimensional model of said object to be tracked;

(ii) localising initial features points in an initial said input image stream;

(iii) calculating an initial state vector indicative of a location of said object within said input image stream, wherein said initial state vector is calculated by minimising the square error between localised said initial features points and corresponding initial feature points of said three-dimensional model projected into an image plane;

(a) rendering said three-dimensional object model, wherein said object model accords with either a predicted state vector calculated in step (d) of a previous iteration or said initial state vector calculated in step (iii), wherein the rendering includes calculating a mask for said input image stream to distinguish between background and foreground pixels;

(b) calculating a predefined number of features points from said object, wherein a corresponding predefined number of locations having highest edginess is selected as features from an image of said input image stream corresponding to the previous iteration for the following localisation step;

(c) localising corresponding point features in said input image stream;

(d) calculating a new state vector from localised said features points in said input image stream; and (e) iteratively performing steps (a) though (d) for providing at each iteration updated said new state vector from localised said features points.

14. A system according to claim 13, wherein said processor is adapted to perform a masked normalised template correlation for calculating new localised features points.

15. A system according to claim 14, wherein said processor is adapted to apply said new localised features points into a Kalman filter for calculating said new state vector.

* * * * *